United States Patent
Nakade et al.

(10) Patent No.: US 12,213,021 B2
(45) Date of Patent: Jan. 28, 2025

(54) COMMUNICATION APPARATUS, VEHICLE, INFORMATION PROCESSING SYSTEM, NON-TRANSITORY COMPUTER READABLE MEDIUM, AND SERVER

(71) Applicant: Toyota Jidosha Kabushiki Kaisha, Toyota (JP)

(72) Inventors: Yusuke Nakade, Nagoya (JP); Miho Otsuka, Nagoya (JP); Hirokazu Kano, Nagoya (JP); Evan Vijithakumara, Frisco, TX (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 853 days.

(21) Appl. No.: 17/388,696

(22) Filed: Jul. 29, 2021

(65) Prior Publication Data
US 2022/0038850 A1    Feb. 3, 2022

(30) Foreign Application Priority Data
Aug. 3, 2020    (JP) .................................. 2020-132033

(51) Int. Cl.
*H04W 4/02* (2018.01)
*H04W 4/44* (2018.01)
*H04W 4/46* (2018.01)

(52) U.S. Cl.
CPC ............. *H04W 4/023* (2013.01); *H04W 4/44* (2018.02); *H04W 4/46* (2018.02)

(58) Field of Classification Search
CPC ......... H04W 4/023; H04W 4/44; H04W 4/46; H04W 4/029; H04W 4/40; H04W 4/30; H04W 4/42; H04W 4/48; G01S 5/0284
See application file for complete search history.

(56) References Cited

U.S. PATENT DOCUMENTS

| 2017/0101054 A1* | 4/2017 | Dusane | ............ G08G 1/096741 |
| 2019/0096260 A1* | 3/2019 | Ahn | ................. G08G 1/096791 |

(Continued)

FOREIGN PATENT DOCUMENTS

| JP | 2001-146146 A | 5/2001 |
| JP | 2004086263 A | 3/2004 |

(Continued)

*Primary Examiner* — Marcus Hammonds
(74) *Attorney, Agent, or Firm* — Dinsmore & Shohl LLP

(57) ABSTRACT

A communication apparatus according to the present disclosure is a communication apparatus included in a first vehicle, the communication apparatus including a communication interface and a controller. The communication interface communicates with a server. The controller detects a second vehicle located in a vicinity of the first vehicle. The controller generates positional information for the second vehicle based on a position of the first vehicle when the second vehicle is detected. The controller transmits the positional information for the second vehicle to the server via the communication interface, when the communication interface can communicate with the server. The controller stores the positional information for the second vehicle as unsent information for the first vehicle, when the communication interface cannot communicate with the server, and transmits the unsent information for the first vehicle to the server via the communication interface, when the communication interface becomes able to communicate with the server.

17 Claims, 6 Drawing Sheets

(56) References Cited

U.S. PATENT DOCUMENTS

2019/0149598 A1* 5/2019 Sawada ................ G05D 1/0297
                                                   701/2
2019/0387564 A1* 12/2019 Kim ...................... H04W 76/14
2020/0175784 A1   6/2020 Nakagawa

FOREIGN PATENT DOCUMENTS

| JP | 2007-067533 A | 3/2007 |
| JP | 2016-212610 A | 12/2016 |
| JP | 2019-079330 A | 5/2019 |
| JP | 2020-091587 A | 6/2020 |

* cited by examiner

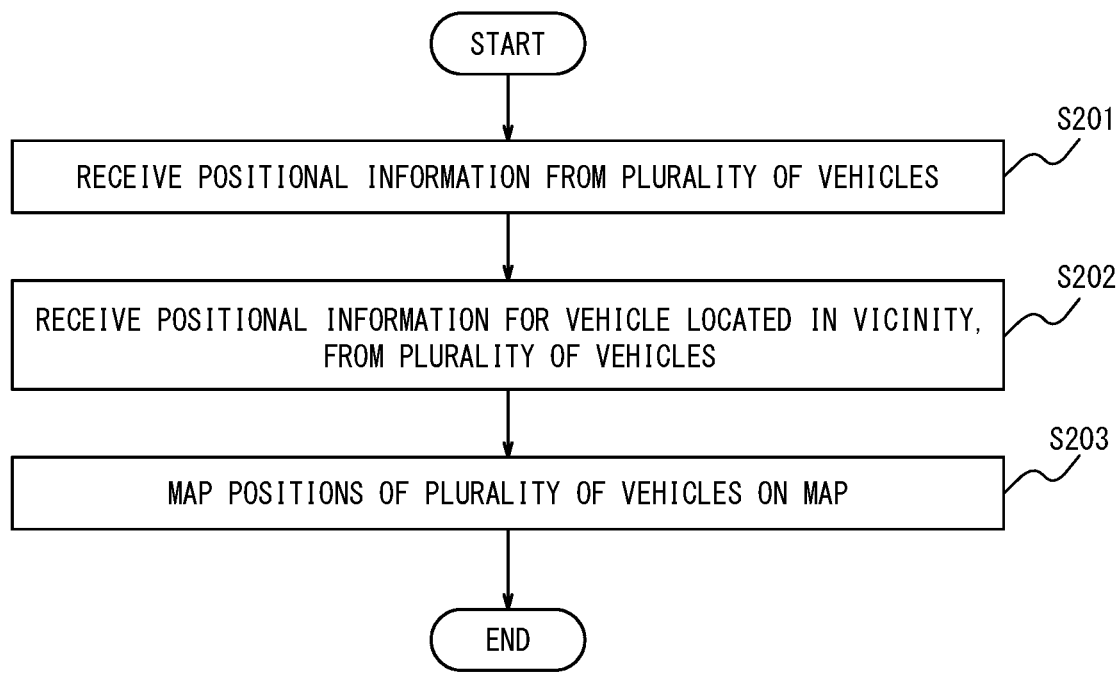

COMMUNICATION APPARATUS, VEHICLE, INFORMATION PROCESSING SYSTEM, NON-TRANSITORY COMPUTER READABLE MEDIUM, AND SERVER

CROSS-REFERENCE TO RELATED APPLICATION

This application claims priority to Japanese Patent Application No. 2020-132033, filed on Aug. 3, 2020, the entire contents of which are incorporated herein by reference.

TECHNICAL FIELD

The present disclosure relates to a communication apparatus, a vehicle, an information processing system, a program, and a server.

BACKGROUND

Technology for identifying the positions of vehicles in remote locations is known. For example, Patent Literature (PTL) 1 discloses a vehicle positional information providing method in which a fixed station communicates with a vehicle, receives positional information for the vehicle from the vehicle, and provides the positional information to a communication terminal apparatus.

CITATION LIST

Patent Literature

PTL 1: JP 2004-086263 A

SUMMARY

In recent years, there has been a need to further improve the utility of technology for identifying the positions of vehicles in remote locations. For example, there is a need to remotely identify the position of a vehicle even when communication with the vehicle cannot be performed due to reasons such as the vehicle being out of communication range or the communication function of the vehicle being failed.

It would be helpful to provide a communication apparatus, a vehicle, an information processing system, a program, and a server that improve the utility of technology for identifying the positions of vehicles in remote locations.

A communication apparatus according to an embodiment of the present disclosure is a communication apparatus included in a first vehicle, the communication apparatus including:
  a communication interface configured to communicate with a server; and
  a controller configured to:
    detect a second vehicle located in a vicinity of the first vehicle;
    generate positional information for the second vehicle based on a position of the first vehicle when the second vehicle is detected;
    transmit the positional information for the second vehicle to the server via the communication interface, when the communication interface can communicate with the server; and
    store the positional information for the second vehicle as unsent information for the first vehicle, when the communication interface cannot communicate with the server, and transmit the unsent information for the first vehicle to the server via the communication interface, when the communication interface becomes able to communicate with the server.

A vehicle according to an embodiment of the present disclosure includes the communication apparatus.

An information processing system according to an embodiment of the present disclosure includes:
  the communication apparatus; and
  the server.

A program according to an embodiment of the present disclosure is configured to cause a computer to function as a communication apparatus included in a first vehicle, the communication apparatus including:
  a communication interface configured to communicate with a server; and
  a controller configured to:
    detect a second vehicle located in a vicinity of the first vehicle;
    generate positional information for the second vehicle based on a position of the first vehicle when the second vehicle is detected;
    transmit the positional information for the second vehicle to the server via the communication interface, when the communication interface can communicate with the server; and
    store the positional information for the second vehicle as unsent information for the first vehicle, when the communication interface cannot communicate with the server, and transmit the unsent information for the first vehicle to the server via the communication interface, when the communication interface becomes able to communicate with the server.

A server according to an embodiment of the present disclosure includes:
  a communication interface configured to communicate with a plurality of vehicles; and
  a controller configured to:
    receive via the communication interface, from a first vehicle that can communicate with the communication interface among the plurality of vehicles, positional information for a second vehicle stored in the first vehicle; and
    identify a position of the second vehicle based on the positional information for the second vehicle received from the first vehicle, when the communication interface cannot communicate with the second vehicle.

A communication apparatus, a vehicle, an information processing system, a program, and a server according to an embodiment of the present disclosure improve the utility of technology for identifying the positions of vehicles in remote locations.

BRIEF DESCRIPTION OF THE DRAWINGS

In the accompanying drawings:

FIG. 6 is a flowchart illustrating an outline of operations of a server according to an embodiment.

DETAILED DESCRIPTION

Figure 1:
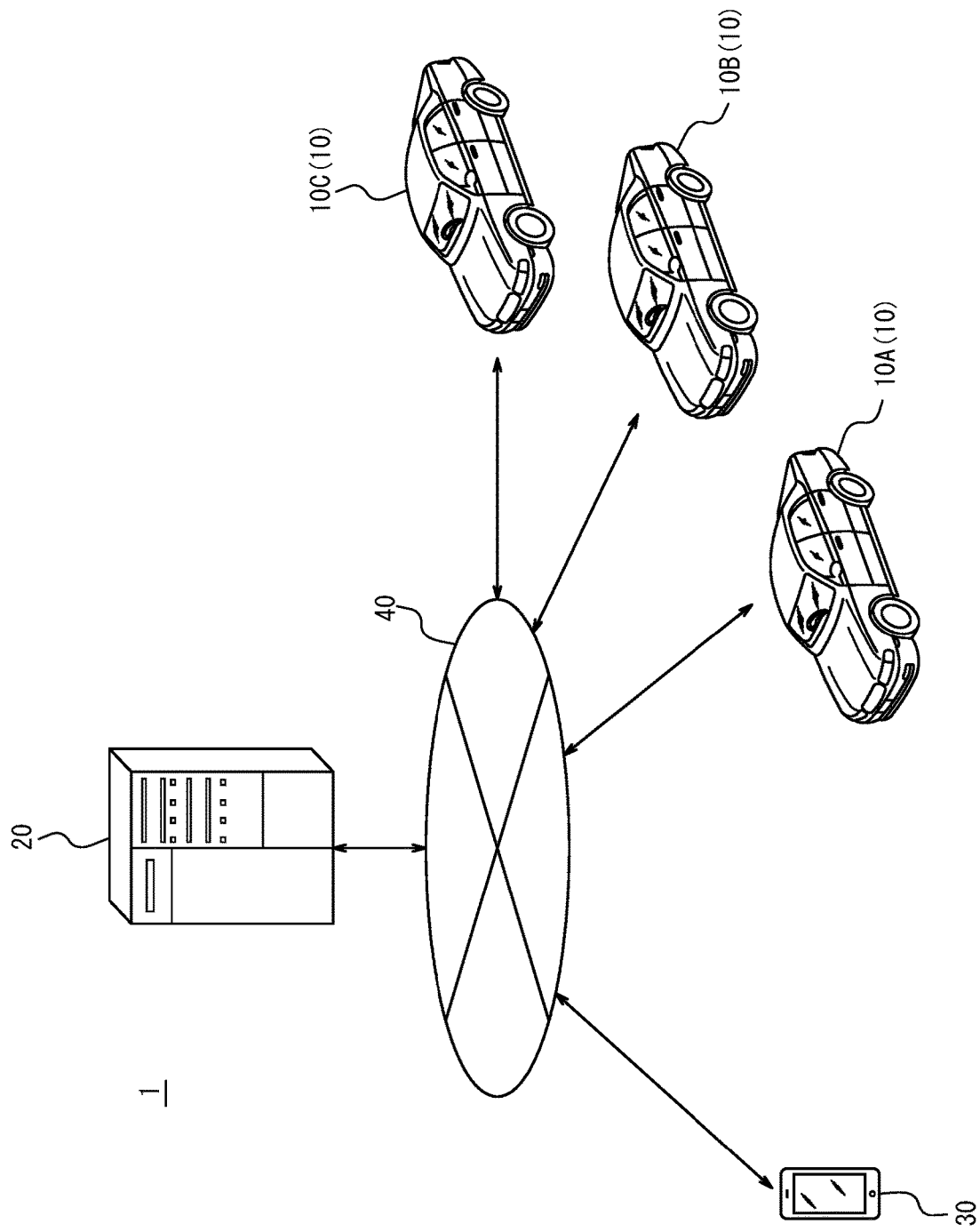
FIG. 1 is a diagram illustrating a schematic configuration of an information processing system according to an embodiment of the present disclosure.

Hereinafter, an embodiment of the present disclosure will be described.

In the drawings, the same or corresponding portions are denoted by the same reference numerals. In the descriptions of the present embodiment, detailed descriptions of the same or corresponding portions are omitted or simplified, as appropriate.

(Configuration of Information Processing System)

With reference to FIG. 1, an outline of the information processing system 1 according to the present embodiment will be described. FIG. 1 is a diagram illustrating a schematic configuration of the information processing system 1. The information processing system 1 includes vehicles 10, a server 20, and a terminal apparatus 30. FIG. 1 illustrates three of the vehicles 10, and one each of the server 20 and the terminal apparatus 30. However, the information processing system 1 may include any number of vehicles 10, servers 20, and terminal apparatuses 30.

The vehicles 10 are, for example, automobiles. However, the vehicles 10 are not limited to automobiles, and may be any vehicles such as motorcycles or bicycles. In the present embodiment, the vehicles 10 include a first vehicle 10A, a second vehicle 10B, and a third vehicle 10C. Hereinafter, the first vehicle 10A, the second vehicle 10B, and the third vehicle 10C are collectively referred to simply as vehicles 10 unless distinguished otherwise. The vehicles 10 may each be driven by a driver, or the driving may be automated at any level. The level of automation is, for example, one of level 1 to level 5 in the level classification of the Society of Automotive Engineers (SAE).

The server 20 is configured by one or more computers. In the present embodiment, the server 20 will be described as being configured by a single computer. However, the server 20 may be configured by multiple computers, such as a cloud computing system.

Examples of the terminal apparatus 30 include a mobile phone, a smartphone, and a computer such as a personal computer. In this specification, a computer is also referred to as an information processing apparatus. In the present embodiment, the terminal apparatus 30 is used, for example, by an owner of any of the vehicles 10.

The terminal apparatus 30 is used by an owner of a vehicle 10 to check the position of the vehicle 10. The terminal apparatus 30 communicates with the server 20 to receive positional information for the vehicle 10 from the server 20. The terminal apparatus 30 displays, for example, through a display, the position of the vehicle 10 on a map, based on an instruction received from the server 20 to display the position of the vehicle 10 on a map.

The network 40 is any communication network through which the vehicles 10, the server 20, and the terminal apparatus 30 can communicate with one another. The network 40 may be wireless or wired transmission lines, or may be a communication network such as the Internet. For example, the network 40 in the present embodiment may include an ad hoc network, a Metropolitan Area Network (MAN), a cellular network, a Wireless Personal Area Network (WPAN), the Public Switched Telephone Network (PSTN), a Terrestrial Wireless Network, an optical network, or another type of network, or a combination of any of these.

Figure 2:
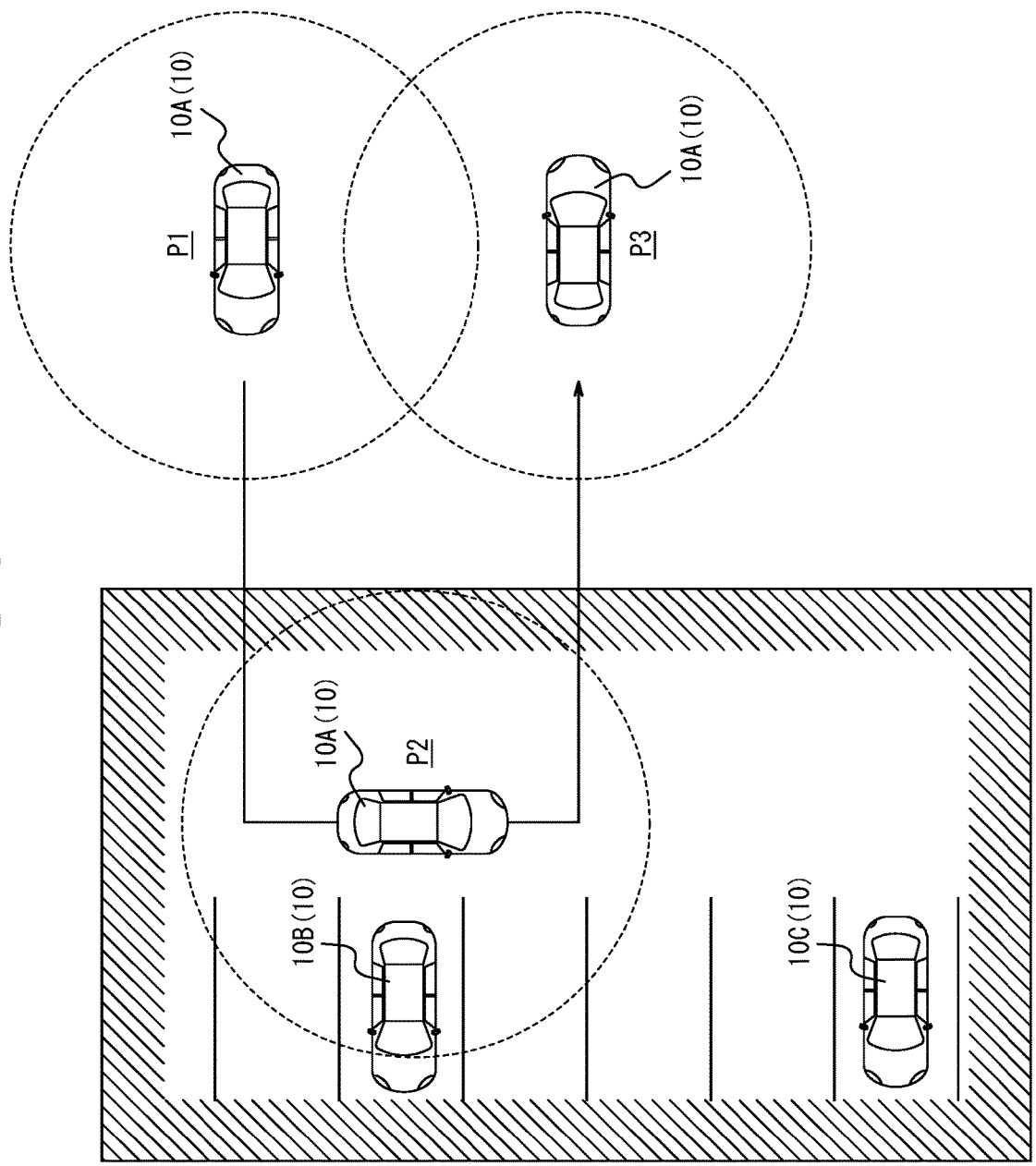
FIG. 2 is a schematic diagram illustrating positions of vehicles according to an embodiment.

With reference to FIG. 2, an outline of operations of the information processing system 1 will be described. FIG. 2 is a schematic diagram illustrating positions of the vehicles 10 according to an embodiment. The information processing system 1 is used for a service of providing a user with positional information for the vehicles 10. "Positional information" for a vehicle 10 is information that indicates the position of the vehicle 10 at a certain time point.

In the information processing system 1, the server 20 communicates with each of the first vehicle 10A, the second vehicle 10B, and the third vehicle 10C, to acquire positional information for each of the vehicles 10. However, in some cases, the server 20 cannot communicate with a vehicle 10 due to reasons such as the vehicle 10 being out of communication range or the communication function of the vehicle 10 being failed. In FIG. 2, the hatched area indicates an area that is outside the communication range. The area that is outside the communication range is, for example, an underground parking lot. In FIG. 2, the second vehicle 10B and the third vehicle 10C are located outside the communication range, and the second vehicle 10B and the third vehicle 10C cannot transmit positional information for each of these vehicles 10 to the server 20.

Each of the vehicles 10 according to the present embodiment can generate positional information for other vehicles 10 located in the vicinity of each of the vehicles 10 when detecting the other vehicles 10. For example, a vehicle 10 acquires information in an electronic tag included in another vehicle 10 by an electronic tag reader included in the vehicle 10, to thereby detect that other vehicle 10. In FIG. 2, the broken lines indicate areas within which the first vehicle 10A can detect vehicles 10 other than the first vehicle 10A. In the present embodiment, each area within which other vehicles can be detected is illustrated as a circle, but is not limited to be in a circle shape, and may be in any shape such as a fan shape. As indicated by the arrow in FIG. 2, the first vehicle 10A is assumed to travel in the order of a point P1, a point P2, and a point P3. The first vehicle 10A travels in the vicinity of the second vehicle 10B at the point P2, which is outside the communication range, and then upon detecting the second vehicle 10B, the first vehicle 10A generates positional information for the second vehicle 10B. At the point P2, the first vehicle 10A cannot communicate with the server 20, and thus the first vehicle 10A stores the positional information for the second vehicle 10B as unsent information. Thereafter, when the first vehicle 10A moves to the point P3, which is within the communication range, the first vehicle 10A becomes able to communicate with the server 20, and thus the first vehicle 10A transmits the positional information for the second vehicle 10B to the server 20. This enables, in the information processing system 1, the server 20 to identify the position of the second vehicle 10B, which cannot communicate with the server 20. For example, when an owner of the second vehicle 10B is looking for the second vehicle 10B, the server 20 can transmit the identified position of the second vehicle 10B to the terminal apparatus 30, which is used by the owner of the second vehicle 10B. Therefore, the information processing system 1 improves the utility of technology for identifying the positions of vehicles 10 in remote locations.

Next, the vehicles 10 and the server 20 of the information processing system 1 will be described in detail.

(Configuration of Vehicle)

Figure 3:
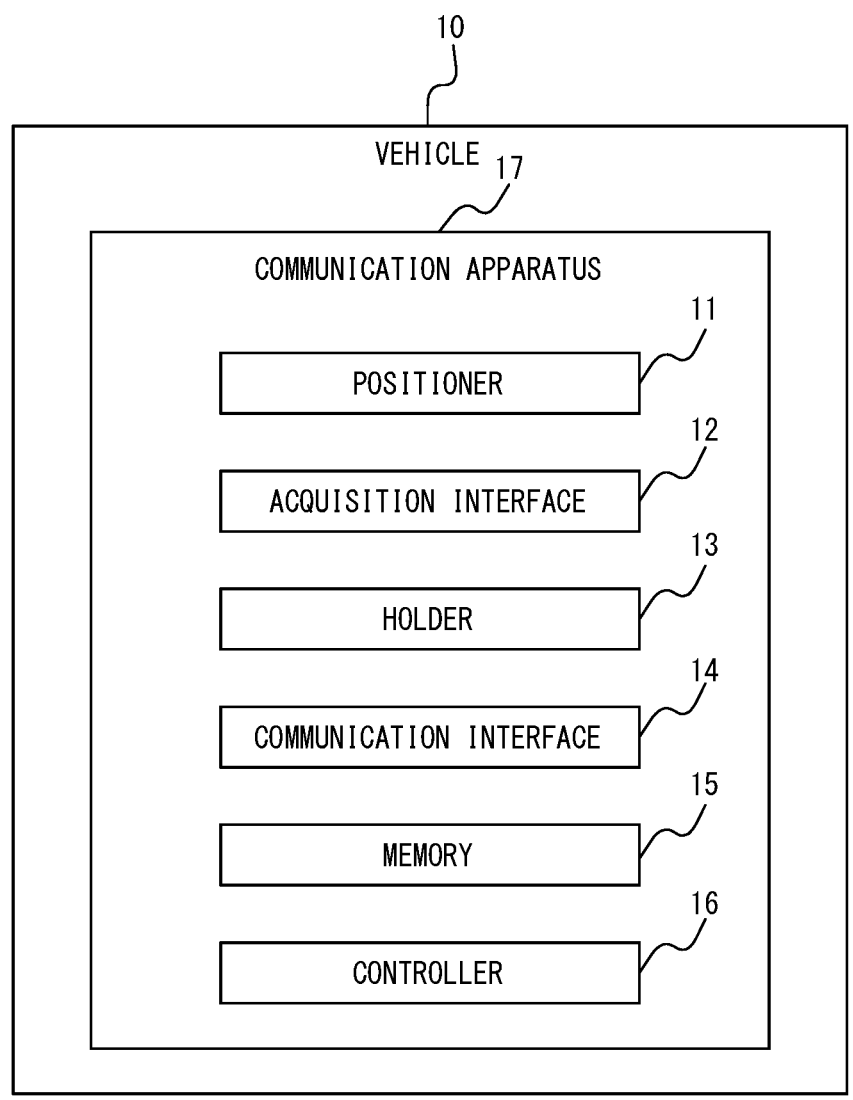
FIG. 3 is a block diagram illustrating a configuration of a vehicle according to an embodiment.

With reference to FIG. 3, a configuration of each of the vehicles 10 according to the present embodiment will be described. FIG. 3 is a block diagram illustrating the configuration of each of the vehicles 10. As illustrated in FIG.

3, each of the vehicles 10 includes a positioner 11, an acquisition interface 12, a holder 13, a communication interface 14, a memory 15, and a controller 16. The positioner 11, the acquisition interface 12, the holder 13, the communication interface 14, the memory 15, and the controller 16 are connected to one another via an in-vehicle network such as a Controller Area Network (CAN) or dedicated lines so as to be able to communicate with one another by wire or wirelessly.

In the present embodiment, a corresponding communication apparatus 17 included in each of the vehicles 10 is described as having all the functions of the positioner 11, the acquisition interface 12, the holder 13, the communication interface 14, the memory 15, and the controller 16. The communication apparatus 17 is, for example, an in-vehicle apparatus such as an Electronic Control Unit (ECU), a car navigation apparatus, or an in-vehicle communication device. Alternatively, the communication apparatus 17 may be a mobile phone, a smartphone, or a computer such as a personal computer, installed on the vehicle 10. Some of the functions described above may be provided by another in-vehicle apparatus mounted in the vehicle 10 that is communicably connected to the communication apparatus 17.

The positioner 11 measures the position of the corresponding vehicle 10, and generates positional information for the corresponding vehicle 10. As described above, positional information for a vehicle 10 is information indicating the position of the vehicle 10 at a certain time point. The positional information for the vehicle 10 includes information that indicates the time point and information that indicates the position of the vehicle 10. The information that indicates the time point is, for example, a date or a time. The information that indicates the position is, for example, coordinates such as two-dimensional coordinates or three-dimensional coordinates. For example, a car navigation apparatus included in each of the vehicles 10 may function as the corresponding positioner 11.

In the present embodiment, the positioner 11 can measure the position of the corresponding vehicle 10 by a combination of navigation using a satellite positioning system and autonomous navigation. The positioner 11 includes a receiver corresponding to the satellite positioning system for measuring the position of the corresponding vehicle 10 by navigation using the satellite positioning system. The satellite positioning system which the receiver corresponds to may, for example, be the Global Positioning System (GPS). Further, the positioner 11 includes a sensor such as an acceleration sensor or a gyro sensor, for measuring the position of the corresponding vehicle 10 by autonomous navigation. According to the aforementioned configuration, the positioner 11 can measure the position of the corresponding vehicle 10 mainly by navigation using the satellite positioning system, and when the corresponding vehicle 10 is traveling underground, in a tunnel, or the like and thus cannot receive radio waves from the satellite positioning system, the positioner 11 can measure the position of the corresponding vehicle 10 by autonomous navigation. However, the positioner 11 may measure the position of the corresponding vehicle 10 by either one of navigation using the satellite positioning system and autonomous navigation.

The acquisition interface 12 acquires information from other vehicles 10 located in the vicinity of the corresponding vehicle 10. In the present embodiment, the acquisition interface 12 acquires, from the respective holders 13 included in the other vehicles 10, information held by those holders 13. The information acquired by the acquisition interface 12 from the other vehicles 10 includes, for example, identification information for the other vehicles 10. Identification information for a vehicle 10 is information for uniquely identifying the vehicle 10. The identification information for the vehicle 10 is, for example, information assigned by the server 20. However, the identification information for the vehicle 10 may be a chassis number, a vehicle registration number, or the like of the vehicle 10. As will be described later in detail, the acquisition interface 12 may acquire, from the other vehicles 10, information other than the identification information, such as information held by the respective holders 13 of the other vehicles 10 as unsent information. In the present embodiment, the vicinity of a vehicle 10 is an area in which the corresponding acquisition interface 12 of the vehicle 10 can acquire information.

For example, the acquisition interface 12 includes an electronic tag reader. In such a case, the electronic tag reader of the acquisition interface 12 acquires, through wireless communication, information such as identification information for another vehicle 10 stored in an electronic tag of that other vehicle 10. The wireless communication method supported by the electronic tag reader may be, for example, Radio Frequency Identification (RFID), Near Field Communication (NFC), Ultra-High Frequency (UHF), or the like.

The acquisition interface 12 may include a camera. In such a case, the camera of the acquisition interface 12 acquires information such as identification information for another vehicle 10 displayed on a display included in that other vehicle 10. The display may display information such as identification information in the form of a two-dimensional code such as, for example, a QR code® (QR code is a registered trademark in Japan, other countries, or both). Alternatively, the camera of the acquisition interface 12 may acquire information such as identification information for another vehicle 10 displayed on the license plate included in that other vehicle 10.

The acquisition interface 12 may include a communication device that performs vehicle-to-vehicle communication. In such a case, the communication device of the acquisition interface 12 acquires, through vehicle-to-vehicle communication, information such as identification information for another vehicle 10 from a communication device included in that other vehicle 10.

The holder 13 holds information in a manner in which the information can be acquired by other vehicles 10. More specifically, the holder 13 holds information in a manner in which the information can be acquired by the respective acquisition interfaces 12 of the other vehicles 10. In the present embodiment, the holder 13 is assumed as being able to update information held therein under control of the controller 16. Examples of the holder 13 include an electronic tag, a display, and a communication device for performing vehicle-to-vehicle communication. However, the holder 13 may be, such as a license plate, incapable of updating information held therein under control of the controller 16.

The information held by the holder 13 includes identification information for the corresponding vehicle 10. In the present embodiment, the information held by the holder 13 further includes unsent information. "Unsent information" is information before being transmitted to the server 20 from a vehicle 10. The unsent information includes, for example, information before being transmitted, among positional information for another vehicle 10 detected by the vehicle 10. Further, the unsent information may include information indicating the status of the vehicle 10. The information indicating the status of the vehicle 10 may include, for example, information indicating "the vehicle 10 being out of fuel", "the vehicle 10 being out of battery", or "the vehicle 10 being failed".

In the present embodiment, the holder 13 is non-volatile. The non-volatile holder 13 requires no electric power to keep holding information. The non-volatile holder 13 includes, for example, a passive tag which is an electronic tag that can operate using a radio wave from an electronic tag reader as an energy source, or a non-volatile display such as electronic paper based on electrophoresis. In such cases, the holder 13 can keep holding information even when no electric power is supplied from the corresponding vehicle 10 to the holder 13 due to the corresponding vehicle 10 being out of fuel, for example, and present the information to the acquisition interface 12 of another vehicle 10.

The holder 13 may be installed at a position where the holder 13 cannot be easily removed from outside the corresponding vehicle 10. The holder 13 may be installed, for example, in an engine room or a vehicle cabin. In such cases, the holder 13 is unlikely to be removed from the corresponding vehicle 10 by theft, mischief, or the like.

The communication interface 14 includes a communication module for connecting to the network 40. The communication module is, for example, a communication module compliant with a mobile communication standard such as the 4th Generation (4G) standard or the 5th Generation (5G) standard. The communication module may be, for example, a communication module compliant with a standard such as a wired Local Area Network (LAN) standard or a wireless LAN standard. The communication module may be a communication module compliant with a short-range wireless communication standard such as Wi-Fi® (Wi-Fi is a registered trademark in Japan, other countries, or both), Bluetooth® (Bluetooth is a registered trademark in Japan, other countries, or both), or an infrared communication standard. In the present embodiment, the corresponding vehicle 10 is connected to the network 40 via the communication interface 14. This enables the corresponding vehicle 10 to communicate with the server 20 or the like.

The memory 15 is, for example, a semiconductor memory, a magnetic memory, an optical memory, or the like. The memory 15 functions as, for example, a main memory, an auxiliary memory, or a cache memory. The memory 15 stores any information used for operations of the vehicle 10. For example, the memory 15 stores a system program, an application program, embedded software, or the like. The information stored in the memory 15 may be updated with, for example, information acquired from the network 40 via the communication interface 14.

The controller 16 includes at least one processor. The processor may be, for example, a general purpose processor such as a Central Processing Unit (CPU), a dedicated processor that is dedicated to specific processing, or the like. The controller 16 is not limited to a processor and may include at least one dedicated circuit. Examples of the dedicated circuit may include a Field-Programmable Gate Array (FPGA) and an Application Specific Integrated Circuit (ASIC). The controller 16 controls the components such as the positioner 11, the acquisition interface 12, the holder 13, the communication interface 14, and the memory 15 that are described above in order to realize the functions of the communication apparatus 17, including the functions of the components.

The functions of the communication apparatus 17 are realized by executing a communication apparatus program according to the present embodiment on a processor of a computer. That is, the functions of the communication apparatus 17 are realized by software. The communication apparatus program is a program for causing a computer to execute the processing of steps included in operations of the communication apparatus 17, thereby enabling the computer to realize the functions corresponding to the processing of the steps. That is, the communication apparatus program is a program for causing the computer to function as the communication apparatus 17.

The program can be recorded on a non-transitory computer readable recording medium. The non-transitory computer readable recording medium is, for example, a magnetic recording device, an optical disc, a magneto-optical recording medium, or a semiconductor memory. The distribution of the program is performed by, for example, sale, transfer, or rental of a portable recording medium such as a digital versatile disc (DVD) or a compact disc read only memory (CD-ROM) on which the program is recorded. Alternatively, the program may be distributed by storing the program in a storage of a predetermined server and transferring the program from the predetermined server to another computer. The program may also be provided as a program product.

The computer temporarily stores, for example, a program recorded on a portable recording medium or a program transferred from a predetermined server, in a memory. Then, the computer reads the program stored in the memory using a processor, and executes processing in accordance with the read program using the processor. The computer may read a program directly from the portable recording medium, and execute processing in accordance with the program. Each time a program is transferred from the predetermined server to the computer, the computer may execute processing in accordance with the received program in order. The processing may be executed through a so-called application service provider (ASP) type service which realizes functions merely by execution of instructions and acquisition of results, without transferring the program from the predetermined server to the computer. Programs encompass information that is to be used for processing by a computer and is thus equivalent to a program. For example, data that is not a direct command to a computer but has a property that regulates processing of the computer is "equivalent to a program" in this context.

Figure 4:
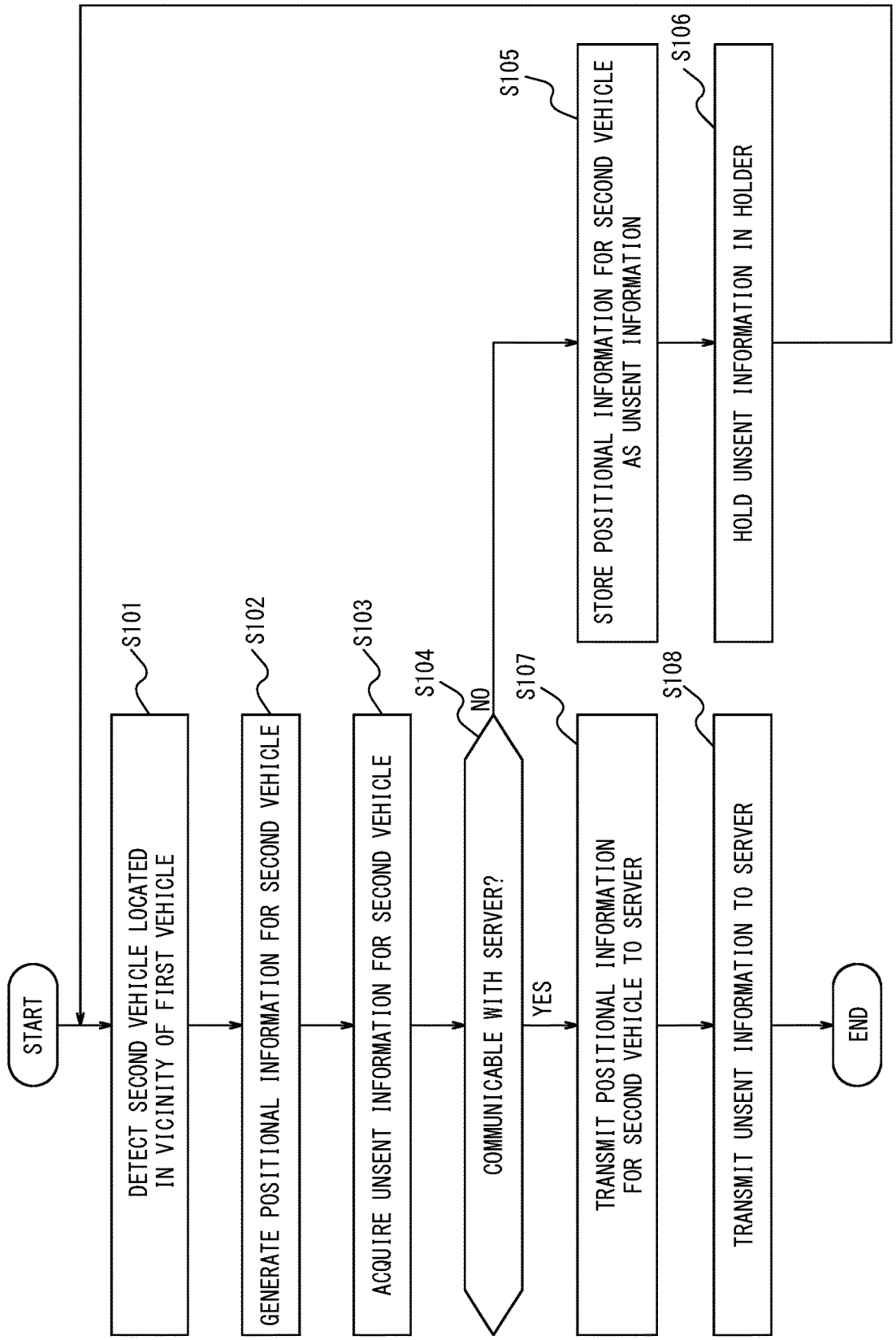
FIG. 4 is a flowchart illustrating operations of a communication apparatus according to an embodiment.

With reference to FIG. 4, operations of the communication apparatus 17 will be described. FIG. 4 is a flowchart illustrating the operations of the communication apparatus 17. The communication apparatus 17 may repeatedly execute the operations at predetermined time intervals or timings. In the explanation of the operations, the communication apparatus 17 is assumed as installed on the first vehicle 10A. Therefore, the operations can also be deemed as operations of the first vehicle 10A that includes the communication apparatus 17. Further, in the explanation of the operations, the second vehicle 10B is assumed as holding, in the corresponding holder 13, positional information for the third vehicle 10C and information indicating the status of the second vehicle 10B as unsent information, together with identification information for the second vehicle 10B.

In Step S101, the controller 16 of the first vehicle 10A detects the second vehicle 10B located in the vicinity of the first vehicle 10A.

Specifically, the controller 16 controls the acquisition interface 12 to acquire the identification information for the second vehicle 10B from the holder 13 included in the second vehicle 10B located in a range where the acquisition interface 12 can acquire information, to thereby detect the second vehicle 10B. In a case in which the acquisition interface 12 includes an electronic tag reader, the controller 16 can acquire, by the electronic tag reader, the identification information for the second vehicle 10B from an electronic tag included in the second vehicle 10B. In a case in which the acquisition interface 12 includes a camera, the controller 16 can acquire, by the camera, the identification information for the second vehicle 10B from a display included in the second vehicle 10B. The controller 16 stores, in the memory 15, the acquired identification information for the second vehicle 10B.

In FIG. 2, the broken lines indicate areas within which the acquisition interface 12 of the first vehicle 10A can acquire information. The second vehicle 10B is included within the broken line at the point P2 while the first vehicle 10A is traveling along the arrow. In such a case, the acquisition interface 12 of the first vehicle 10A acquires the identification information for the second vehicle 10B from the holder 13 of the second vehicle 10B. The controller 16 of the first vehicle 10A detects the second vehicle 10B based on the identification information for the second vehicle 10B acquired by the acquisition interface 12.

With reference again to FIG. 4, in Step S102, the controller 16 of the first vehicle 10A generates positional information for the second vehicle 10B based on the position of the first vehicle 10A when the second vehicle 10B is detected.

Specifically, when the second vehicle 10B is detected in Step S101, the controller 16 measures, by the positioner 11, the position of the first vehicle 10A. The controller 16 can measure the position of the first vehicle 10A by the positioner 11 using a combination of navigation using a satellite positioning system and autonomous navigation. The controller 16 may use any method to generate the positional information for the second vehicle 10B based on the position of the first vehicle 10A. For example, the controller 16 may generate the positional information for the second vehicle 10B by assuming that the position of the first vehicle 10A as the position of the second vehicle 10B. Alternatively, the controller 16 may generate the positional information for the second vehicle 10B by correcting the position of the first vehicle 10A based on a relative distance between the first vehicle 10A and the second vehicle 10B. The controller 16 may calculate the relative distance between the first vehicle 10A and the second vehicle 10B based on the strength of a radio wave received by the electronic tag reader of the acquisition interface 12 or the size of the display of the second vehicle 10B appearing in an image captured by the camera of the acquisition interface 12. The relative distance between the first vehicle 10A and the second vehicle 10B may be calculated using Radio Detecting and Ranging (RADAR), Light Detection and Ranging or Laser Imaging Detection and Ranging (LIDAR), or the like without being limited to the method described above. The controller 16 generates the positional information for the second vehicle 10B by assuming that the time point at which the position of the first vehicle 10A is measured as the time point at which the position of the second vehicle 10B is measured. The controller 16 stores, in the memory 15, the generated positional information for the second vehicle 10B.

In Step S103, the controller 16 of the first vehicle 10A acquires, by the acquisition interface 12, unsent information for the second vehicle 10B stored in the second vehicle 10B.

Specifically, the acquisition interface 12 acquires, from the holder 13 included in the second vehicle 10B, the unsent information for the second vehicle 10B together with the identification information for the second vehicle 10B. The controller 16 includes the unsent information for the second vehicle 10B acquired by the acquisition interface 12 from the second vehicle 10B in unsent information for the first vehicle 10A to store the unsent information for the second vehicle 10B. For example, when the positional information for the third vehicle 10C is included in the unsent information for the second vehicle 10B, the controller 16 stores the positional information for the third vehicle 10C as the unsent information for the first vehicle 10A. Further, when the information indicating the status of the second vehicle 10B is included in the unsent information for the second vehicle 10B, the controller 16 stores the information indicating the status of the second vehicle 10B as the unsent information for the first vehicle 10A.

In FIG. 2, the second vehicle 10B is assumed to have traveled in the vicinity of the third vehicle 10C before parked at the position illustrated in FIG. 2 and generated the positional information for the third vehicle 10C, and hold the positional information for the third vehicle 10C as the unsent information in the corresponding holder 13. Further, the second vehicle 10B is assumed to hold information indicating that the second vehicle 10B is out of battery as the unsent information in the corresponding holder 13, when the second vehicle 10B stops functioning due to the second vehicle 10B being out of battery while parked at the position illustrated in FIG. 2. While the first vehicle 10A is traveling along the arrow, the acquisition interface 12 of the first vehicle 10A acquires, at the point P2, the unsent information for the second vehicle 10B together with the identification information for the second vehicle 10B from the holder 13 of the second vehicle 10B. Thus, the controller 16 of the first vehicle 10A stores, in the memory 15, the positional information for the third vehicle 10C and the information indicating the status of the second vehicle 10B (the second vehicle 10B being out of battery), as the unsent information.

With reference again to FIG. 4, in Step S104, the controller 16 of the first vehicle 10A determines whether the communication interface 14 can communicate with the server 20, in order to transmit the unsent information stored in the memory 15 to the server 20. For example, the controller 16 may transmit a predetermined signal to the server 20 via the communication interface 14 and receive a predetermined signal from the server 20, to thereby determine that the communication interface 14 can communicate with the server 20.

When the communication interface 14 cannot communicate with the server 20 (Step S104—No), the controller 16 of the first vehicle 10A stores, in the memory 15, the positional information for the second vehicle 10B as the unsent information in Step S105. When the communication interface 14 becomes able to communicate with the server 20, the unsent information stored in the memory 15 is transmitted to the server 20 via the communication interface 14.

In FIG. 2, the first vehicle 10A determines whether the communication interface 14 can communicate with the server 20 at the point P2. The point P2 is outside the communication range and the communication interface 14 cannot communicate with the server 20, and thus the controller 16 stores, in the memory 15, information that has not been transmitted to the server 20, as the unsent information. The unsent information for the first vehicle 10A includes the positional information for the second vehicle 10B generated by the controller 16, and the positional information for the third vehicle 10C and the information indicating the status of the second vehicle 10B acquired from the second vehicle 10B.

With reference again to FIG. 4, in Step S106, the controller 16 of the first vehicle 10A holds the unsent information for the first vehicle 10A in a manner in which the unsent information for the first vehicle 10A can be acquired from vehicles 10 other than the first vehicle 10A. Specifically, the controller 16 holds, in the holder 13, the unsent information for the first vehicle 10A stored in the memory 15, together with identification information for the first vehicle 10A. The unsent information held in the holder 13 includes the positional information for the second vehicle 10B that has not been transmitted to the server 20, and the positional information for the third vehicle 10C and the information indicating the status of the second vehicle 10B included in the unsent information acquired from the second vehicle 10B. This enables the first vehicle 10A to have vehicles 10 other than the first vehicle 10A acquire the unsent information for the first vehicle 10A even when the first vehicle 10A itself cannot transmit the unsent information to the server 20 due to the first vehicle 10A being out of fuel, out of battery, failed, or the like. Therefore, the unsent information for the first vehicle 10A can be transmitted to the server 20 via vehicles 10 other than the first vehicle 10A. After the processing of this step is completed, the controller 16 may repeat the processing from Step S101.

When the communication interface 14 can communicate with the server 20 (Step S104—Yes), the controller 16 of the first vehicle 10A transmits the positional information for the second vehicle 10B to the server 20 via the communication interface 14 in Step S107. Specifically, the controller 16 transmits, via the communication interface 14, the identification information for the second vehicle 10B in association with the positional information for the second vehicle 10B to the server 20. The controller 16 may transmit not only the positional information for the second vehicle 10B but also positional information for the first vehicle 10A itself and information indicating the status of the first vehicle 10A to the server 20.

In Step S108, the controller 16 of the first vehicle 10A transmits the unsent information for the first vehicle 10A to the server 20 via the communication interface 14. Specifically, the controller 16 transmits, via the communication interface 14, the unsent information stored in the memory 15, together with the positional information for the second vehicle 10B, to the server 20. After transmitting the unsent information to the server 20, the controller 16 deletes, from the unsent information stored in the memory 15, the information that has been transmitted. After transmitting the unsent information to the server 20, the controller 16 further deletes, from the unsent information held in the holder 13, the information that has been transmitted. After the processing of this step is completed, the controller 16 ends the operations.

In FIG. 2, the first vehicle 10A determines, after having moved to the point P3, whether the communication interface 14 can communicate with the server 20 at the point P3. The point P3 is within the communication range, and thus the communication interface 14 can communicate with the server 20. The controller 16 transmits the positional information for the second vehicle 10B, the positional information for the third vehicle 10C, and the information indicating the status of the second vehicle 10B, which are stored as the unsent information in the memory 15, to the server 20 via the communication interface 14. The controller 16 deletes, from the memory 15 and the holder 13, the information that has been transmitted.

(Configuration of Server)

Figure 5:
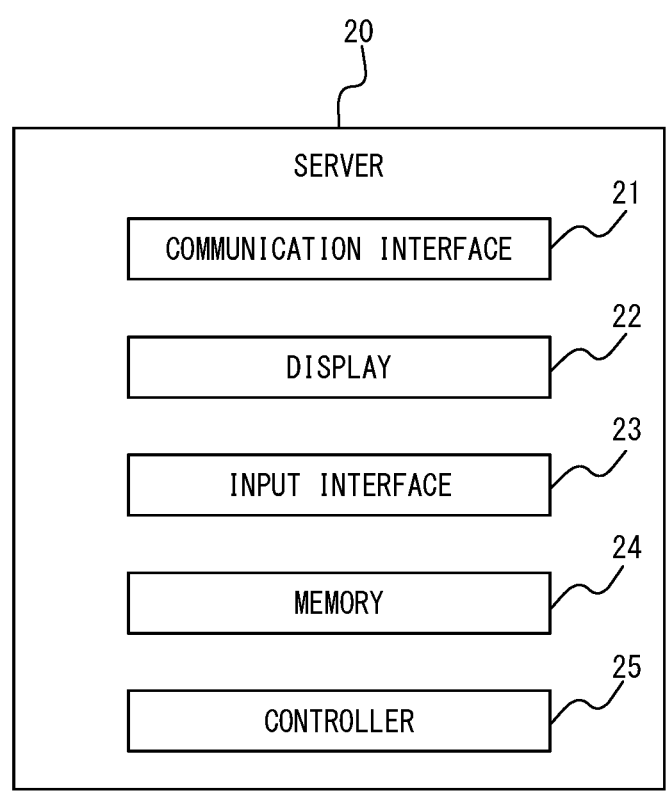
FIG. 5 is a block diagram illustrating a schematic configuration of a server according to an embodiment.

With reference to FIG. 5, a configuration of the server 20 according to the present embodiment will be described. FIG. 5 is a block diagram illustrating the configuration of the server 20. As illustrated in the block diagram of FIG. 5, the server 20 includes a communication interface 21, a display 22, an input interface 23, a memory 24, and a controller 25. The communication interface 21, the display 22, the input interface 23, the memory 24, and the controller 25 are connected so as to be able to communicate with one another by wire or wirelessly.

The communication interface 21 includes a communication module for connecting to the network 40. The communication module is, for example, a communication module compliant with a mobile communication standard such as the 4G standard or the 5G standard. The communication module may be, for example, a communication module compliant with a standard such as a wired LAN standard or a wireless LAN standard. The communication module may be a communication module compliant with a short-range wireless communication standard such as Wi-Fi®, Bluetooth®, or an infrared communication standard.

In the present embodiment, the server 20 is connected to the network 40 via the communication interface 21. This enables the server 20 to communicate with the vehicle 10 and the terminal apparatus 30.

The display 22 displays information in the form of an image, text, or the like. The display 22 includes, for example, a display device such as a monitor.

The input interface 23 accepts input operations. The input interface 23 includes, for example, an input device such as a touch panel, a physical key, a camera, a microphone, or an IC card reader.

The memory 24 is, for example, a semiconductor memory, a magnetic memory, an optical memory, or the like. The memory 24 functions as, for example, a main memory, an auxiliary memory, or a cache memory. The memory 24 stores any information used for operations of the server 20. For example, the memory 24 stores a system program, an application program, embedded software, a database, or the like. The information stored in the memory 24 may be updated with, for example, information acquired from the network 40 via the communication interface 21.

The controller 25 includes at least one processor. The processor may be, for example, a general purpose processor such as a CPU, a dedicated processor that is dedicated to specific processing, or the like. The controller 25 is not limited to a processor and may include at least one dedicated circuit. Examples of the dedicated circuit may include an FPGA and an ASIC. The controller 25 controls the functions of the components such as the communication interface 21, the display 22, the input interface 23, and the memory 24 that are described above in order to realize the functions of the server 20, including the functions of the components.

The functions of the server 20 are realized by executing a control program according to the present embodiment on a processor of a computer. That is, the functions of the server 20 are realized by software. The control program is a program for causing a computer to execute the processing of steps included in the operations of the server 20, thereby enabling the computer to realize the functions corresponding to the processing of the steps. That is, the control program is a program for causing a computer to function as the server 20.

With reference to FIG. 6, operations of the server 20 will be described. FIG. 6 is a flowchart illustrating the operations of the server 20. The server 20 may repeatedly execute the operations at predetermined time intervals or timings. In the explanation of the operations, among the first vehicle 10A, the second vehicle 10B, and the third vehicle 10C, which are configured to communicate with the server 20, the second vehicle 10B and the third vehicle 10C are assumed as being in a status in which the second vehicle 10B and the third vehicle 10C cannot communicate with the server 20. Further, the first vehicle 10A is assumed as storing positional information for the second vehicle 10B and for the third vehicle 10C.

In Step S201, the controller 25 of the server 20 receives, from one or more vehicles 10 that can communicate with the server 20 among a plurality of vehicles 10 via the communication interface 21, positional information for the respective vehicles 10.

Specifically, the controller 25 of the server 20 communicates with the first vehicle 10A via the communication interface 21, and receives positional information for the first vehicle 10A. The controller 25 attempts to communicate with the second vehicle 10B and the third vehicle 10C, via the communication interface 21. However, the controller 25 cannot receive the positional information for the second vehicle 10B and for the third vehicle 10C, because the second vehicle 10B and the third vehicle 10C cannot communicate with the server 20. The controller 25 stores, in the memory 24, the received positional information for the first vehicle 10A.

In Step S202, the controller 25 of the server 20 receives, from one or more vehicles 10 that can communicate with the server 20 among the plurality of vehicles 10 via the communication interface 21, positional information for other vehicles 10 stored in each of the one or more vehicles 10.

Specifically, the controller 25 of the server 20 receives, from the first vehicle 10A, which can communicate with the server 20, among the plurality of vehicles 10 via the communication interface 21, the positional information for the second vehicle 10B and for the third vehicle 10C stored in the first vehicle 10A. The positional information for the second vehicle 10B may be generated by the first vehicle 10A by detecting the second vehicle 10B, as described above with reference to FIG. 4. The positional information for the third vehicle 10C may be acquired by the first vehicle 10A from the second vehicle 10B as unsent information for the second vehicle 10B, as described above with reference to FIG. 4. The controller 25 stores, in the memory 24, the positional information for the second vehicle 10B and for the third vehicle 10C received from the first vehicle 10A.

The controller 25 of the server 20 may store the positional information for the second vehicle 10B received from the first vehicle 10A, eliminating duplicates, as time series information in the memory 24. For example, when the controller 25 has positional information for the second vehicle 10B received from the second vehicle 10B or the like in the past, or has received positional information for the second vehicle 10B from a vehicle 10 other than the first vehicle 10A, the controller 25 compares a plurality of pieces of positional information for the second vehicle 10B. When the plurality of pieces of positional information for the second vehicle 10B include pieces of positional information that indicate different positions of the second vehicle 10B, the controller 25 may arrange the pieces of positional information in chronological order and store the respective pieces of positional information in the memory 24. On the other hand, when the plurality of pieces of positional information for the second vehicle 10B include pieces of positional information that are acquired at different time points but indicate substantially the same position of the second vehicle 10B, the controller 25 may store, in the memory 24, only the latest piece of positional information for the second vehicle 10B.

In Step S203, the controller 25 of the server 20 maps the positions of the plurality of vehicles 10 on a map.

Specifically, the controller 25 identifies the positions of the first vehicle 10A, the second vehicle 10B, and the third vehicle 10C, based on the positional information for the first vehicle 10A, for the second vehicle 10B, and for the third vehicle 10C received from the first vehicle 10A. The controller 25 starts a map application to map the positions of the first vehicle 10A, the second vehicle 10B, and the third vehicle 10C on the map. For example, the controller 25 may display, via the display 22, the map on which the positions of the first vehicle 10A, the second vehicle 10B, and the third vehicle 10C have been mapped. Alternatively, the controller 25 may transmit, via the communication interface 21, an instruction to display the position of each vehicle 10 on a map, to a terminal apparatus 30 of the owner of each vehicle 10. This enables the terminal apparatus 30 to, upon receiving the instruction, display the position of each vehicle 10 on a map on the display 22.

As described above, the communication apparatus 17 according to the present embodiment is a communication apparatus 17 included in a first vehicle 10A. The communication apparatus 17 includes a communication interface 14 configured to communicate with a server 20, and a controller 16 configured to detect a second vehicle 10B located in the vicinity of the first vehicle 10A, generate positional information for the second vehicle 10B based on the position of the first vehicle 10A when the second vehicle 10B is detected, transmit the positional information for the second vehicle 10B to the server 20 via the communication interface 14, when the communication interface 14 can communicate with the server 20, and store the positional information for the second vehicle 10B as unsent information for the first vehicle 10A, when the communication interface 14 cannot communicate with the server 20, and transmit the unsent information for the first vehicle 10A to the server 20 via the communication interface 14, when the communication interface 14 becomes able to communicate with the server 20. According to this configuration, the communication apparatus 17 can detect vehicles 10 other than the first vehicle 10A and transmit positional information for the other vehicles 10 to the server 20. This enables the server 20 to remotely identify the position of a vehicle 10 even when communication with the vehicle 10 cannot be performed due to reasons such as the vehicle 10 being out of communication range or the communication function of the vehicle 10 being failed. Accordingly, the communication apparatus 17 can improve the utility of technology for identifying the positions of vehicles 10 in remote locations.

In the communication apparatus 17 according to the present embodiment, the controller 16 can detect the second vehicle 10B by acquiring identification information for the second vehicle 10B from the second vehicle 10B. According to this configuration, the communication apparatus 17 can automatically detect the second vehicle 10B located in the vicinity of the first vehicle 10A.

The communication apparatus 17 according to the present embodiment includes an electronic tag reader, and the controller 16 can acquire, by the electronic tag reader, the identification information for the second vehicle 10B from an electronic tag included in the second vehicle 10B. According to this configuration, the communication apparatus 17 can detect the second vehicle 10B located in the vicinity of the first vehicle 10A by a simple configuration.

The communication apparatus 17 according to the present embodiment includes a camera, and the controller 16 can acquire, by the camera, the identification information for the second vehicle 10B from a display included in the second vehicle 10B. According to this configuration, the communication apparatus 17 can detect the second vehicle 10B located in the vicinity of the first vehicle 10A by a simple configuration.

In the communication apparatus 17 according to the present embodiment, the controller 16 can transmit, to the server 20, the positional information for the second vehicle 10B in association with the identification information for the second vehicle 10B. According to this configuration, the communication apparatus 17 can facilitate identification, by the server 20, of the position of the second vehicle 10B.

In the communication apparatus 17 according to the present embodiment, the controller 16 can acquire, from the second vehicle 10B, unsent information for the second vehicle 10B stored in the second vehicle 10B, and store positional information for a third vehicle 10C included in the unsent information for the second vehicle 10B, as the unsent information for the first vehicle 10A. According to this configuration, the communication apparatus 17 can transmit, on behalf of the second vehicle 10B, the positional information for the third vehicle 10C that the second vehicle 10B has failed to transmit to the server 20 due to the second vehicle 10B being out of fuel, out of battery, failed, or the like.

In the communication apparatus 17 according to the present embodiment, the controller 16 can hold the unsent information for the first vehicle 10A in a manner in which the unsent information for the first vehicle 10A can be acquired from a vehicle 10 other than the first vehicle 10A. According to this configuration, the communication apparatus 17 can have other vehicles 10 acquire the unsent information that the first vehicle 10A has failed to transmit to the server 20 due to the first vehicle 10A being out of fuel, out of battery, failed, or the like. This enables the unsent information for the first vehicle 10A to be transmitted to the server 20 via other vehicles 10.

In the communication apparatus 17 according to the present embodiment, the communication apparatus 17 includes a positioner 11, and the controller 16 can measure, by the positioner 11, the position of the first vehicle 10A using a combination of navigation using a satellite positioning system and autonomous navigation. According to this configuration, the communication apparatus 17 can measure the position of the first vehicle 10A by autonomous navigation even when the first vehicle 10A is traveling underground, in a tunnel, or the like and cannot receive radio waves from the satellite positioning system.

The server 20 according to the present embodiment includes a communication interface 21 configured to communicate with a plurality of vehicles 10, and a controller 25 configured to receive via the communication interface 21, from a first vehicle 10A that can communicate with the communication interface 21 among the plurality of vehicles 10, positional information for a second vehicle 10B stored in the first vehicle 10A, and identify the position of the second vehicle 10B based on the positional information for the second vehicle 10B received from the first vehicle 10A, when the communication interface 21 cannot communicate with the second vehicle 10B. According to this configuration, the server 20 can remotely identify the position of a vehicle 10 even when communication with the vehicle 10 cannot be performed due to reasons such as the vehicle 10 being out of communication range or the communication function of the vehicle 10 being failed. Accordingly, the server 20 can improve the utility of technology for identifying the positions of vehicles 10 in remote locations.

In the server 20 according to the present embodiment, the controller 25 can store the positional information for the second vehicle 10B received from the first vehicle 10A, eliminating duplicates, as time series information. According to this configuration, the server 20 can save the processing capacity such as the storage capacity for managing positional information for the plurality of vehicles 10.

In the server 20 according to the present embodiment, the controller 25 can map the position of the second vehicle 10B on a map. According to this configuration, the server 20 can present the position of a vehicle 10 to a user in a more easy-to-understand manner. Thus, the server 20 can improve the utility of technology for identifying the positions of vehicles 10 in remote locations.

While the present disclosure has been described with reference to the drawings and examples, it should be noted that various modifications and revisions can be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

For example, in the embodiment described above, all or some of the functions or processes described as the functions or processes of the server 20 may be realized as functions or processes of the communication apparatus 17 of any of the vehicles 10 or the terminal apparatus 30. Specifically, a program in which processes for realizing the functions of the server 20 according to the embodiment are written may be stored in a memory of the communication apparatus 17 or the like, and the program may be read and executed by a processor of the communication apparatus 17 or the like. Similarly, a program in which processes for realizing the functions of the communication apparatus 17 according to the embodiment are written may be stored in a memory of the server 20 or the like, and the program may be read and executed by a processor of the server 20 or the like.

For example, a configuration in which a general purpose computer such as a smartphone functions as the communication apparatus 17 or the server 20 according to the embodiment described above can also be implemented. Specifically, a program in which processes for realizing the functions of the communication apparatus 17 or the server 20 according to the embodiment are written may be stored in a memory of the computer, and the program may be read and executed by a processor of the computer. For example, a case in which a general purpose computer functions as the communication apparatus 17 of any of the vehicles 10 can be realized by installing a computer having the configuration and the functions of the communication apparatus 17 of any of the vehicles 10 described above in the corresponding vehicle 10.

The invention claimed is:

1. A communication apparatus included in a first vehicle, the communication apparatus comprising:
   a communication interface configured to communicate with a server; and
   a controller configured to:
      detect a second vehicle located in a vicinity of the first vehicle;

generate positional information for the second vehicle based on a position of the first vehicle when the second vehicle is detected;

transmit the positional information for the second vehicle to the server via the communication interface, when the communication interface can communicate with the server; and store the positional information for the second vehicle as unsent information for the first vehicle, when the communication interface cannot communicate with the server, and transmit the unsent information for the first vehicle to the server via the communication interface, when the communication interface becomes able to communicate with the server.

2. The communication apparatus according to claim 1, wherein the controller is configured to detect the second vehicle by acquiring identification information for the second vehicle from the second vehicle.

3. The communication apparatus according to claim 2, comprising an electronic tag reader, wherein the controller is configured to acquire, by the electronic tag reader, the identification information for the second vehicle from an electronic tag included in the second vehicle.

4. The communication apparatus according to claim 2, comprising a camera, wherein the controller is configured to acquire, by the camera, the identification information for the second vehicle from a display included in the second vehicle.

5. The communication apparatus according to claim 2, wherein the controller is configured to transmit, to the server, the positional information for the second vehicle in association with the identification information for the second vehicle.

6. The communication apparatus according to claim 2, wherein the controller is configured to:

acquire, from the second vehicle, unsent information for the second vehicle stored in the second vehicle; and store positional information for a third vehicle included in the unsent information for the second vehicle, as the unsent information for the first vehicle.

7. The communication apparatus according to claim 1, wherein the controller is configured to hold the unsent information for the first vehicle in a manner in which the unsent information for the first vehicle can be acquired from a vehicle other than the first vehicle.

8. The communication apparatus according to claim 1, comprising a positioner, wherein the controller is configured to measure, by the positioner, the position of the first vehicle using a combination of navigation using a satellite positioning system and autonomous navigation.

9. A vehicle comprising the communication apparatus according to claim 1.

10. An information processing system comprising:
the communication apparatus according to claim 1; and
the server.

11. A non-transitory computer readable medium storing a program configured to cause a computer to function as a communication apparatus included in a first vehicle, the communication apparatus comprising:

a communication interface configured to communicate with a server; and a controller configured to:
detect a second vehicle located in a vicinity of the first vehicle;

generate positional information for the second vehicle based on a position of the first vehicle when the second vehicle is detected;

transmit the positional information for the second vehicle to the server via the communication interface, when the communication interface can communicate with the server; and store the positional information for the second vehicle as unsent information for the first vehicle, when the communication interface cannot communicate with the server, and transmit the unsent information for the first vehicle to the server via the communication interface, when the communication interface becomes able to communicate with the server.

12. The non-transitory computer readable medium according to claim 11, wherein the communication apparatus is configured to detect the second vehicle by acquiring identification information for the second vehicle from the second vehicle.

13. The non-transitory computer readable medium according to claim 12, wherein the first vehicle comprises an electronic tag reader, and the communication apparatus is configured to acquire, by the electronic tag reader, the identification information for the second vehicle from an electronic tag included in the second vehicle.

14. The non-transitory computer readable medium according to claim 12, wherein the first vehicle comprises a camera, and the communication apparatus is configured to acquire, by the camera, the identification information for the second vehicle from a display included in the second vehicle.

15. The non-transitory computer readable medium according to claim 12, wherein the communication apparatus is configured to transmit, to the server, the positional information for the second vehicle in association with the identification information for the second vehicle.

16. The non-transitory computer readable medium according to claim 12, wherein the communication apparatus is configured to:

acquire, from the second vehicle, unsent information for the second vehicle stored in the second vehicle; and store positional information for a third vehicle included in the unsent information for the second vehicle, as the unsent information for the first vehicle.

17. The non-transitory computer readable medium according to claim 11, wherein the communication apparatus is configured to hold the unsent information for the first vehicle in a manner in which the unsent information for the first vehicle can be acquired from a vehicle other than the first vehicle.

* * * * *